(12) United States Patent
Soles

(10) Patent No.: US 6,398,179 B1
(45) Date of Patent: Jun. 4, 2002

(54) FASTENER-LESS SPRING ASSEMBLY

(75) Inventor: Peter J. Soles, Tecumseh (CA)

(73) Assignee: General Motors Corporation, Detroit, MI (US)

(*) Notice: Subject to any disclaimer, the term of this patent is extended or adjusted under 35 U.S.C. 154(b) by 0 days.

(21) Appl. No.: 09/487,462

(22) Filed: Jan. 19, 2000

(51) Int. Cl.[7] .............................................. F16M 13/00
(52) U.S. Cl. ............. 248/617; 248/222.51; 248/222.52; 248/223.21; 248/225.21; 280/124.157
(58) Field of Search ................................ 248/560, 617, 248/310, 222.51, 222.52, 222.41, 225.21; 267/122, 64.23; 403/348, 350; 280/124.157

(56) References Cited

U.S. PATENT DOCUMENTS

| | | | |
|---|---|---|---|
| 1,771,682 A | * 7/1930 | Landau | |
| 2,117,759 A | 5/1938 | Douglas | 240/41 |
| 2,496,928 A | 2/1950 | Bing et al. | 285/177 |
| 2,773,686 A | * 12/1956 | Nash | 267/122 |
| 3,009,719 A | * 11/1961 | Otto et al. | |
| 4,725,029 A | 2/1988 | Herve | 248/223.1 |
| 4,757,786 A | 7/1988 | Ellegard | 123/2 |
| 4,773,788 A | 9/1988 | Ruhl | 403/24 |
| 4,784,046 A | 11/1988 | Gautier | 92/128 |
| 4,790,235 A | 12/1988 | Gautier et al. | 92/128 |
| 4,881,850 A | 11/1989 | Abreo, Jr. | 405/169 |
| 4,913,382 A | * 4/1990 | Vanacker | |
| 5,409,256 A | * 4/1995 | Gordon et al. | 403/348 X |
| 5,624,167 A | * 4/1997 | Katz | 403/348 X |
| 5,688,030 A | 11/1997 | McAnally et al. | 312/223.2 |

* cited by examiner

Primary Examiner—Anita King
Assistant Examiner—Korie H. Chan
(74) Attorney, Agent, or Firm—Laura C. Hargitt

(57) ABSTRACT

A fastener-less spring assembly for a vehicle includes an axle spring seat adapted to be secured to an axle of a vehicle. The fastener-less spring assembly also includes a frame spring seat adapted to be secured to a frame of the vehicle. The fastener-less spring assembly further includes an inflatable air spring having a base for attachment to the axle spring seat and a mounting cap for attachment to the frame spring seat. The frame spring seat has at least one slot extending therethrough and the mounting cap has at least one projection extending through the slot and being rotated relative to the frame spring seat to prevent the projection from exiting the slot to attach the mounting cap to the frame spring seat.

13 Claims, 5 Drawing Sheets

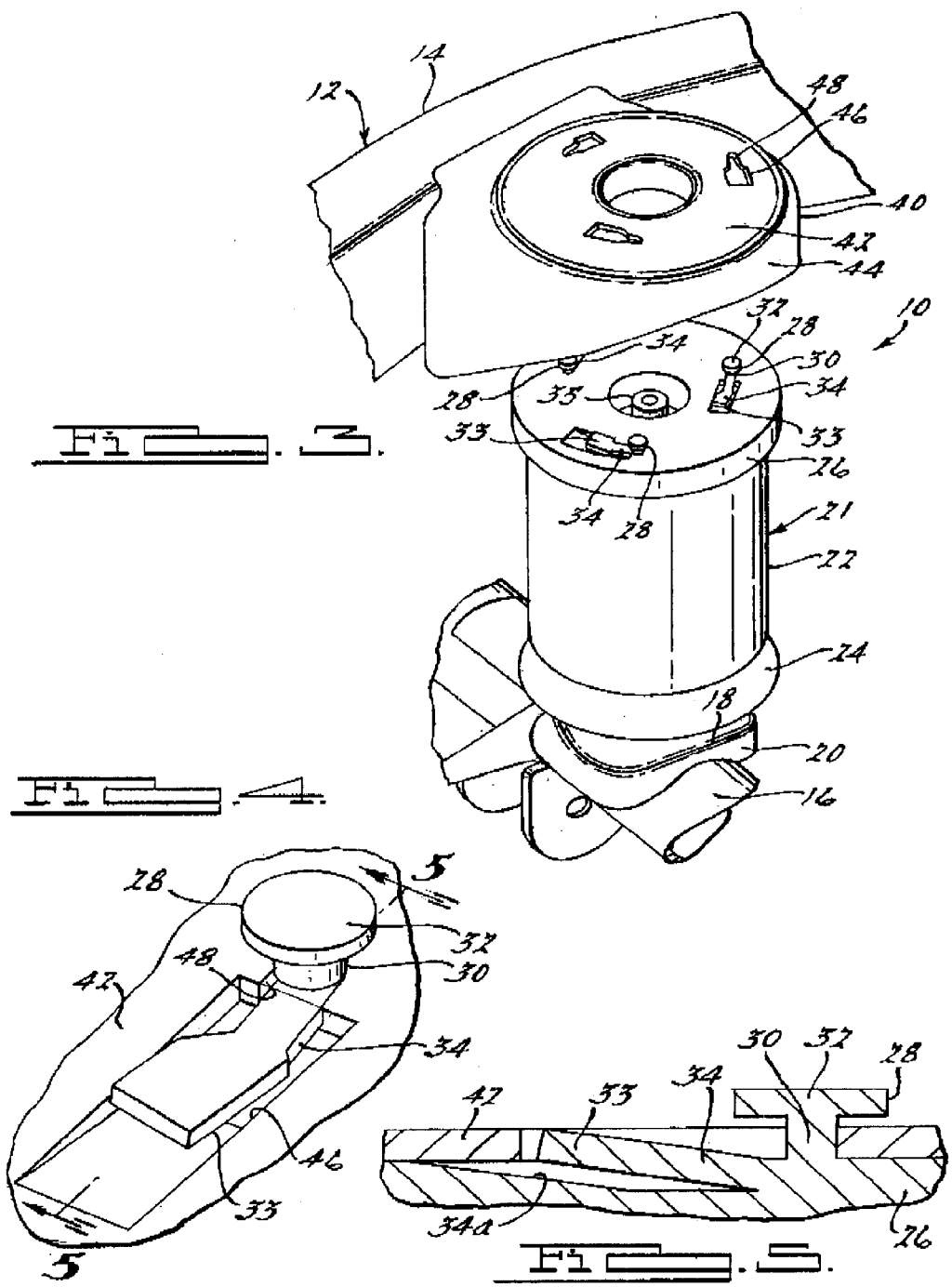

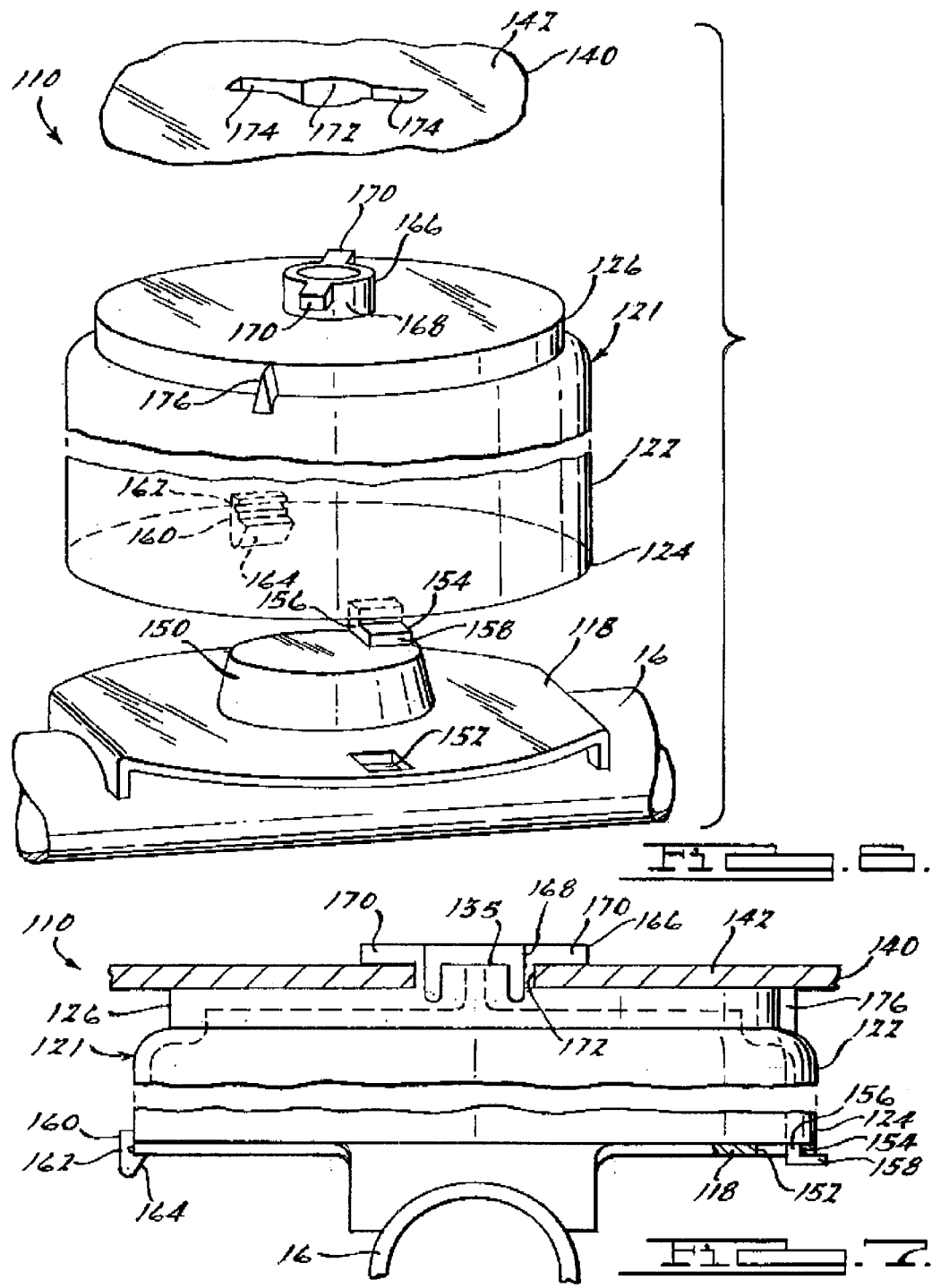

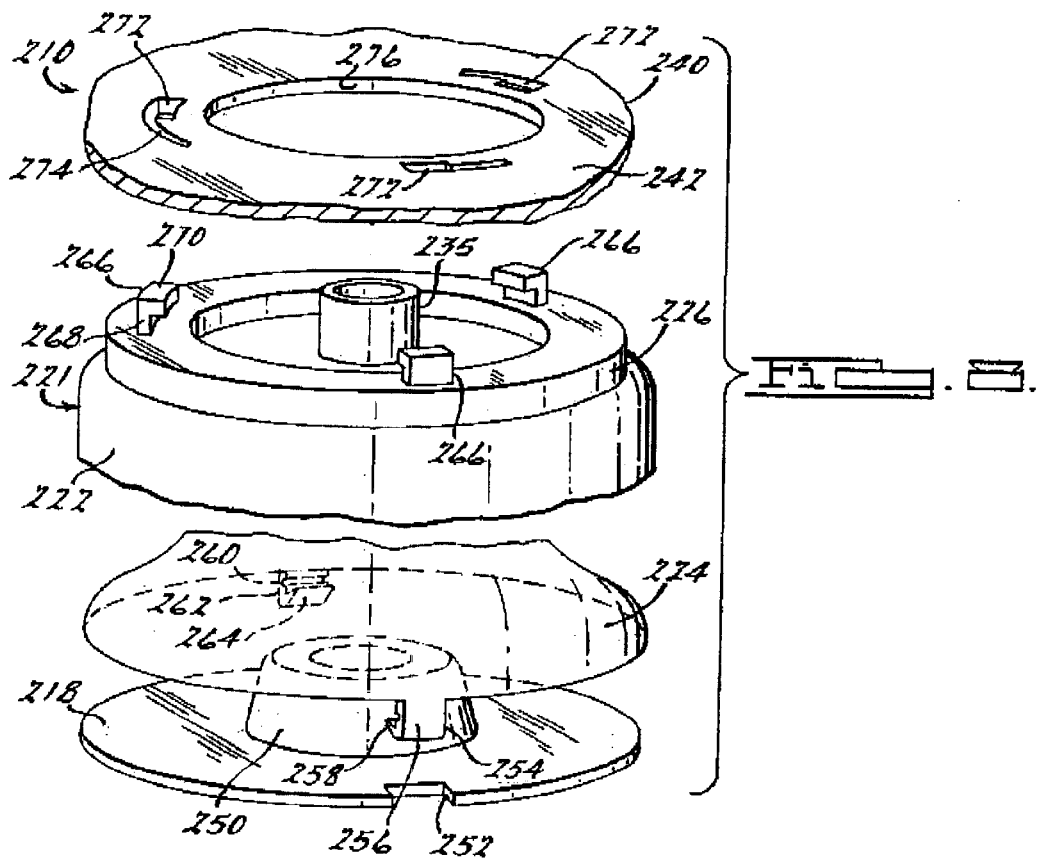
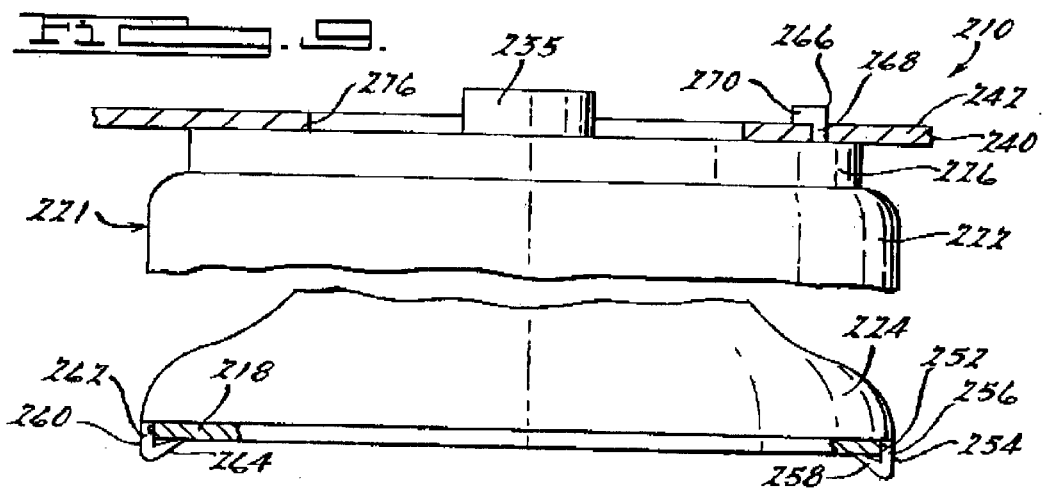

FASTENER-LESS SPRING ASSEMBLY

TECHNICAL FIELD

The present invention relates generally to springs for vehicles and, more particularly, to a fastener-less spring assembly for a vehicle.

BACKGROUND OF THE INVENTION

It is known to provide an air spring assembly for a vehicle between a chassis frame or body (on a unibody vehicle) and axle thereof. Typically, the air spring assembly includes an inflatable air spring that has a lower end fastened to the axle and an upper end fastened to the frame of the vehicle. Generally, fasteners such as bolts, clips, split pins, rivets or nuts are used to fasten the air spring assembly to the axle and frame.

Therefore, it is desirable to provide an air spring assembly for a vehicle that is easy to install. It is also desirable to provide an air spring assembly for a vehicle that eliminates the need for separate fasteners.

SUMMARY OF THE INVENTION

It is, therefore, a preferred aspect of the present invention to provide a fastener-less spring assembly for a vehicle that eliminates the need for separate fasteners to be secured to a vehicle and that requires no special tooling or equipment for attachment to a vehicle.

To achieve the foregoing, the present invention is a fastener-less spring assembly for a vehicle. The fastener-less spring assembly includes an axle spring seat adapted to be secured to an axle of a vehicle. The fastener-less spring assembly also includes a frame spring seat adapted to be secured to a frame of the vehicle. The fastener-less spring assembly further includes a spring having a base for the axle spring seat and a cap for attachment to the frame spring seat. The frame spring seat has at least one slot extending therethrough and the cap has at least one projection extending through the slot and being rotated relative to the frame spring seat to prevent the projection from exiting the slot to attach the mounting cap to the frame spring seat.

Preferred advantages of the present invention include: The fastener-less spring assembly eliminates the need for separate parts and requires minimal labor time and cost to assemble to the vehicle; The fastener-less spring assembly requires no special tooling or equipment such as torque equipment to attach the spring assembly to the vehicle or for torquing or torque monitoring; The fastener-less spring assembly has parts that are non-handed such that one part is used on both sides of the vehicle; The fastener-less spring assembly has a self-locking feature that prevents back out once it is in place; The fastener-less spring assembly does not require replacement of clips, split pins, or nuts and bolts when the assembly is taken apart and reassembled; The fastener-less spring assembly removes the inherent variation of a bolted assembly and requires less labor to assemble than the bolted assembly; and The fastener-less spring assembly eliminates the cost of separate fasteners, reduces part number count, has easy removal and replacement in service and provides a quality assembly.

Other objects, features and advantages of the present invention will be readily appreciated, as the same becomes better understood, after reading the subsequent description taken in conjunction with the accompanying drawings.

BRIEF DESCRIPTION OF THE DRAWINGS

FIG. 3 is an exploded perspective view of the fastener-less spring assembly of FIG. 1.

FIG. 4 is a perspective view of a portion of the fastener-less spring assembly of FIG. 1.

FIG. 5 is a sectional view taken along line 5—5 of FIG. 4.

FIG. 6 is an exploded fragmentary perspective view of another embodiment, according to the present invention, of the fastener-less spring assembly of FIG. 1.

FIG. 6A is a fragmentary elevational view of a portion of the fastener-less spring assembly of FIG. 6.

FIG. 7 is a fragmentary elevational view showing top and bottom portions of the fastener-less spring assembly of FIG. 6.

FIG. 9 is a fragmentary elevational view showing top and bottom portions of the fastener-less spring assembly of FIG. 8.

DESCRIPTION OF THE PREFERRED EMBODIMENT

Figure 1:
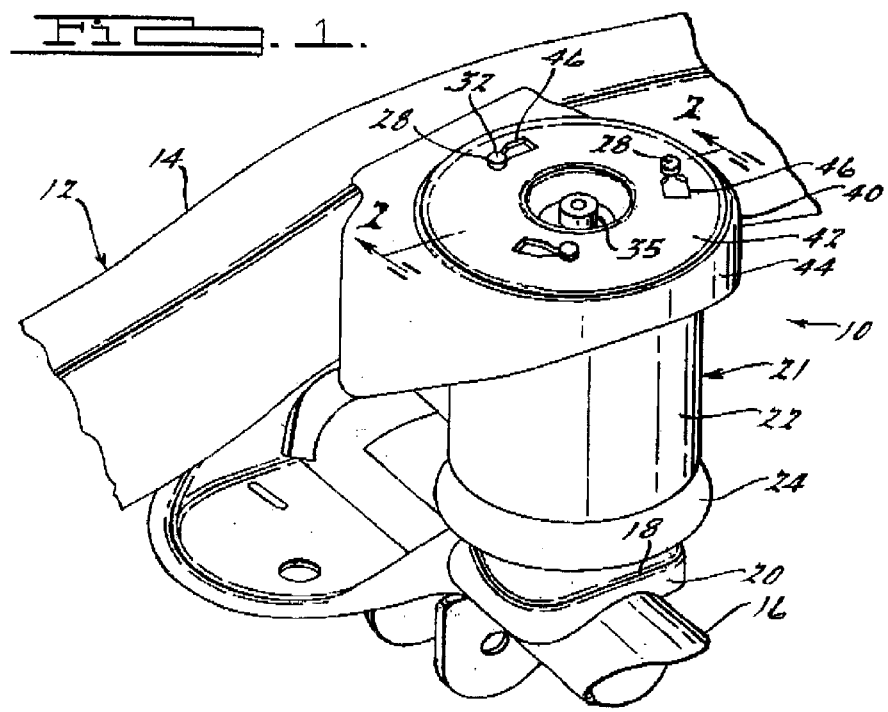
FIG. 1 is a perspective view of a fastener-less spring assembly, according to the present invention, illustrated in operational relationship with a vehicle.
Figure 2:
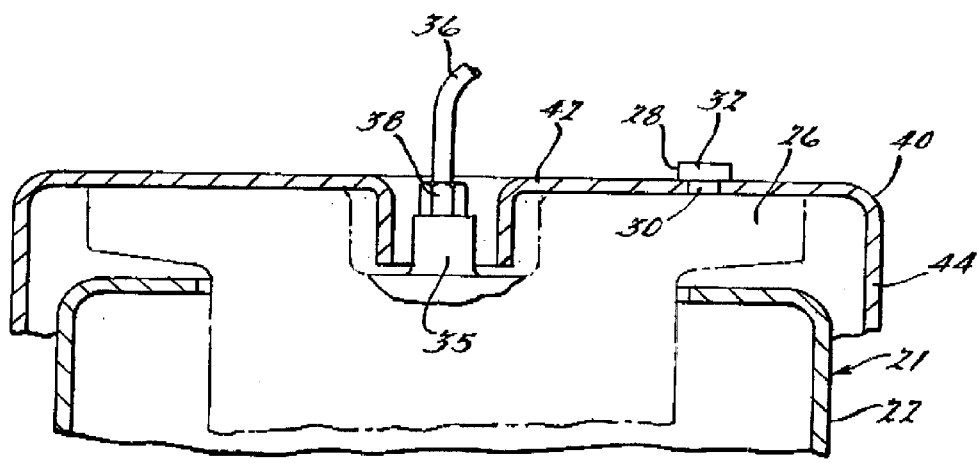
FIG. 2 is a sectional view taken along line 2—2 of FIG. 1.

Referring to the drawings and in particular FIGS. 1 through 5, one embodiment of a fastener-less spring assembly 10 described as a fastener-less air spring assembly, according to the present invention, is shown for a vehicle (partly shown), such as a pick-up truck or sport utility vehicle, generally indicated at 12. Such vehicles 12 typically include a frame 14 (partially shown) and an axle 16. It should be appreciated that the fastener-less air spring assembly 10 is mounted between the axle 16 and frame 14 to reduce movement therebetween.

In the embodiment illustrated, the fastener-less air spring assembly 10 includes an axle spring seat 18 disposed on the axle 16. The axle spring seat 18 is generally planar and circular in shape. The axle spring seat 18 includes at least one flange 20 extending downwardly and generally perpendicular thereto. The axle spring seat 18 may be secured to the axle 16 by suitable means such as welding or be formed as part of the axle 16. The axle spring seat 18 may include a projection (not shown) extending upwardly for a function to be described. It should be appreciated that the axle spring seat 18 does not rotate.

The fastener-less air spring assembly 10 also includes an air spring, generally indicated at 21, disposed between the axle spring seat 18 and a frame spring seat 40 to be described. The air spring 21 includes an inflatable air spring diaphragm 22 extending vertically. The air spring diaphragm 22 is generally cylindrical in shape and has a generally circular shaped cross-section. The air spring 21 also includes a base 24 at a lower end of the diaphragm attached to the axle spring seat 18 by suitable means as described in connection with FIGS. 6 through 8. The base 24 is generally circular in shape and has a diameter greater than a diameter of the air spring diaphragm 22. It should be appreciated that the base 24 has a projection (not shown) to be received in a slot (not shown) of the axle spring seat 18 to be removably attached thereto.

The air spring 21 further includes a mounting cap 26 at an upper end of the diaphragm 22. The mounting cap 26 is generally circular in shape. The mounting cap 26 has at least one, preferably a plurality of, such as three, projections or mounting pins 28 extending upwardly therefrom. The mounting pins 28 are spaced circumferentially thereabout near a periphery thereof. Preferably, the mounting pins 28 are radially located one hundred twenty degrees (120°) apart on the same pitch circle diameter. The mounting pins 28 have a shaft 30 extending axially and being generally cylindrical in shape. The mounting pins 28 also have a head 32 extending radially from an upper end of the shaft 30 and being generally planar and circular in shape. The head 32 has a diameter greater than the shaft 30 for a function to be described.

The mounting cap 26 also includes an antirotation tab 33 extending upwardly and circumferentially therefrom adjacent each mounting pin 28. The anti-rotation tab 33 is generally rectangular in shape and extends upwardly at a predetermined angle such as five degrees (5°) from an upper surface thereof. The anti-rotation tab 33 is connected to the mounting cap 26 by a connecting portion 34 thereof. The connecting portion 34 is generally rectangular in shape and has a width less than a width of a remainder of the anti-rotation tab 33 to allow the anti-rotation tab 33 to deflect. It should be appreciated that the anti-rotation tab 33 is disposed in a recess 34a when defected toward the mounting cap 26.

The mounting cap 26 includes an air inlet 35 extending upwardly from a center thereof to allow the air spring diaphragm 22 to be inflated. The air inlet 35 is connected to one end of an air line or conduit 36 by a quick connector fitting or connector 38. The other end of the conduit 36 is connected to a source of air (not shown). The mounting cap 26 is made of a rigid material, preferably a plastic or metal material. The mounting pins 28 may be either molded or heat staked into the mounting cap 26 if made of a plastic material. The mounting pins 28 may be threaded or welded into the mounting cap 26 if made of a metal material. It should be appreciated that the air spring diaphragm 22 is inflated by the source of air. It should also be appreciated that, except for the base 24 and mounting cap 26, the air spring 21 is conventional and known in the art.

The fastener-less air spring assembly 10 further includes a frame spring seat 40 connected to the frame 14. The frame spring seat 40 has a top wall 42 generally planar and circular in shape. The frame spring seat 40 has a side wall 44 extending downwardly and generally perpendicular thereto. The side wall 44 is connected to the frame 42 by suitable means such as welding. The frame spring seat 40 includes at least one, preferably a plurality of slots 46 disposed circumferentially thereabout and extending through the top wall 42. Preferably, the slots 46 are radially located one hundred twenty degrees (120°) apart on the same pitch circle diameter corresponding to the mounting pins 28 in the mounting cap 26. The slots 46 are generally rectangular in shape. The slots 46 have a pin portion 48 extending circumferentially from one end and having a width less than a remainder of the slots 46 to receive the shaft 30 of the mounting pins 28. The frame spring seat 40 is made of a rigid material, preferably a metal material. It should be appreciated that the slots 46 neck down from a width larger than the heads 32 of the mounting pins 28 to one smaller for the pin portion 48, for example, fourteen millimeters down to eight millimeters.

In operation of the fastener-less air spring assembly 10, the base 24 of the air spring 21 is attached to the axle spring seat 18 as will be described in connection with FIGS. 6 though 8. The mounting cap 26 is attached to the frame spring seat 40 by locating the mounting pins 28 relative to the slots 46 and extending the heads 32 therethrough. The mounting cap 26 is rotated such that the shaft 30 of the mounting pins 28 moves into the narrower part or pin portion 48 of the slots 46 and locates it in place. At this point, the anti-rotation tabs 33 spring upward into the slots 46 and lock the air spring 21 in place. The air spring diaphragm 22 is then inflated. To remove the air spring 21, the air spring diaphragm 22 is deflated and the anti-rotation tabs 33 are depressed. The mounting cap 26 is rotated in a direction opposite to insertion to remove to the mounting pins 28 from the slots 46 and the frame spring seat 40. It should also be appreciated that the operation may be repeated to reassembly the air spring 21 to the seats 18 and 40.

Referring to FIGS. 6, 6A and 7, another embodiment 110, according to the present invention, of the fastener-less air spring assembly 10 is shown. Like parts of the fastener-less air spring assembly 10 have like reference numerals increased by one hundred (100). In this embodiment, the fastener-less air spring assembly 110 includes the axle spring seat 118 having a projection 150 extending upwardly. The projection 150 is generally cylindrical in shape and disposed in a corresponding recess (not shown) in the base 124 of the air spring 121. The axle spring seat 118 also has at least one aperture or slot 152 extending therethrough. The slot 152 is generally rectangular in shape. The fastener-less air spring assembly 110 also includes the base 124 of the air spring 121 having a first or base clip 154 extending axially therefrom. The first clip 154 has a base portion 156 extending axially and being generally rectangular in shape. The first clip 154 also has a flange portion 158 extending radially outwardly from the base portion 156 and generally perpendicular thereto. The base 124 also includes a second or hinged clip 160 extending axially from a periphery thereof. The second clip 160 has a base portion 162 extending axially and being generally rectangular in shape. The second clip 160 also has a flange portion 164 extending radially outwardly from the base portion 162 and generally perpendicular thereto.

The mounting cap 126 has at least one projection, preferably a single center key 166 for attachment to the frame spring seat 140. The center key 166 has a base portion 168 generally cylindrical and circular in cross-sectional shape. The center key 166 has opposed key portions 170 extending radially from the base portion 168. The key portions 170 are generally rectangular in shape. The frame spring seat 140 has a central aperture 172 extending through the top wall 142. The aperture 172 is generally circular in shape. The frame spring seat 140 also has opposed key slots 174 extending radially from the aperture 172 and axially through the top wall 142. The key slots 174 are generally rectangular in shape. The mounting cap 126 may include a keyway orientation arrow 176 on a side thereof and aligned along an axis with the key portions 170 for a function to be described. It should be appreciated that the base portion 168 of the center key 166 also functions as the air inlet portion of the mounting cap 126.

In operation of the fastener-less air spring assembly 110, the mounting cap 126 of the air spring 121 is attached to the frame spring seat 140 by locating the center key 166 relative to the aperture 172 via the keyway orientation arrow 176 and extending the key portions 170 through the key slots 174. The mounting cap 126 is rotated such that the key portions 170 overlap the top wall 142 of the frame spring seat 140. The base 124 of the air spring 121 is attached to the axle spring seat 118 by disposing the first mounting clip 154 through the slot 152 such that the flange portion 158 overlaps the axle spring seat 118 and deflecting the second mounting clip 160 such that the flange portion 164 overlaps the axle spring seat 118. The air spring diaphragm 122 is then inflated. To remove the air spring 121, the air spring diaphragm 121 is deflated and the operation reversed to remove to the air spring 121 from the spring seats 118 and 140.

Figure 8A:
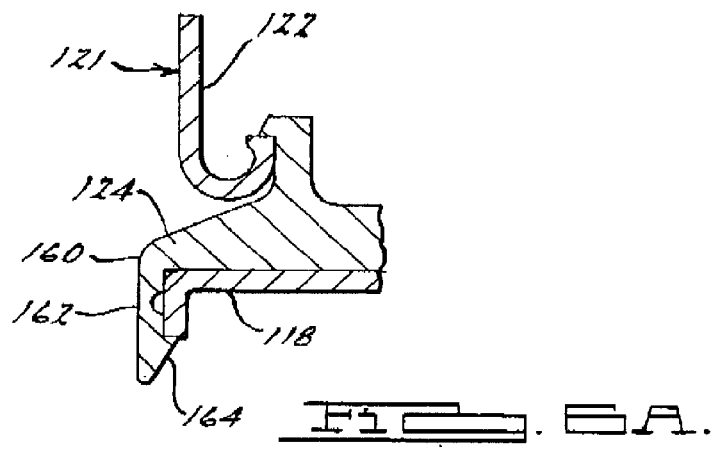
FIG. 8 is an exploded fragmentary perspective view of yet another embodiment, according to the present invention, of the fastener-less spring assembly of FIG. 1.

Referring to FIGS. 8 and 9, another embodiment 210, according to the present invention, of the fastener-less air spring assembly 10 is shown. Like parts of the fastener-less air spring assembly 10 have like reference numerals increased by two hundred (200). In this embodiment, the fastener-less air spring assembly 210 includes the axle spring seat having a projection 250 extending upwardly. The projection 250 is generally cylindrical in shape and disposed in a corresponding recess (not shown) in the base 224 of the air spring 221. The axle spring seat 218 also has at least one aperture or slot 252 extending therethrough and radially inward from a peripheral edge thereof. The slot 252 is generally rectangular in shape. The fastener-less air spring assembly 210 also includes the base 224 of the air spring 221 having a first or base clip 254 extending axially therefrom. The first clip 254 has a base portion 256 extending axially and being generally rectangular in shape. The first clip 254 also has a flange portion 258 extending radially outwardly from the base portion 256 and generally perpendicular thereto. The base 224 also includes a second or hinged clip 260 extending axially from a periphery thereof. The second clip 260 has a base portion 262 extending axially and being generally rectangular in shape. The second clip 260 also has a flange portion 264 extending radially outwardly from the base portion 262 and generally perpendicular thereto.

Figure 9A:
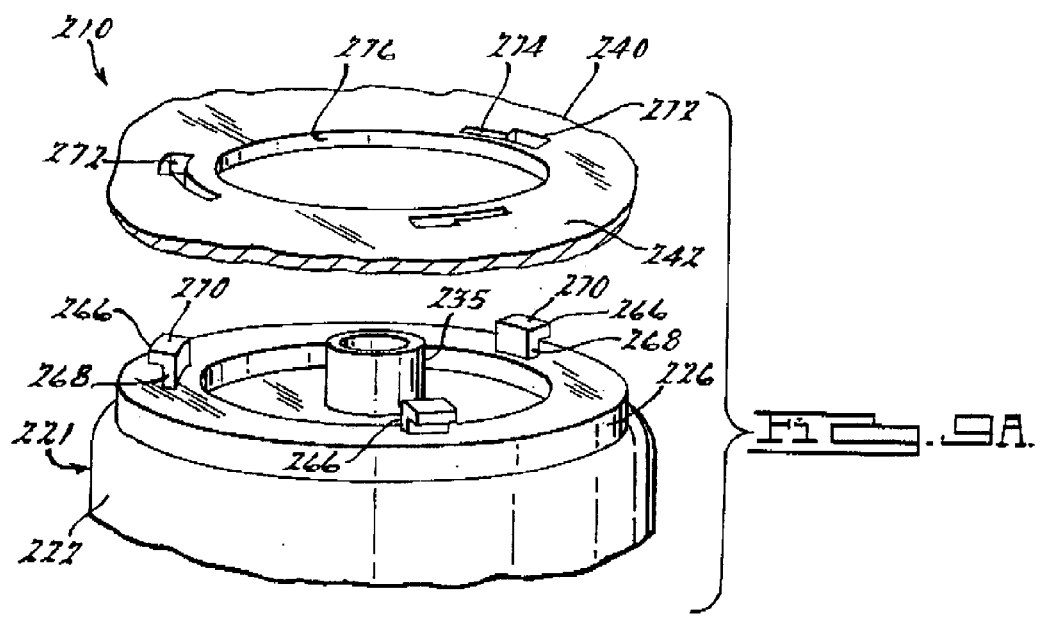
FIG. 9A is an exploded perspective view of still another embodiment of the top portion of the fastener-less spring assembly of FIG. 8.

The mounting cap 226 has at least one, preferably a plurality of, such as three, projections or mounting tabs 266 for attachment to the frame spring seat 240. The mounting tabs 266 are spaced circumferentially thereabout near a periphery thereof. Preferably, the mounting tabs 266 are radially located one hundred twenty degrees (120°) apart on the same pitch circle diameter. The mounting tabs 266 have a base portion 268 extending axially and being generally rectangular in shape. The mounting tabs 266 also have a flange portion 270 extending radially inwardly from an upper end of the base portion 268 and being generally rectangular in shape as illustrated in FIG. 9. Alternatively, the flange portion 270 may extend radially outwardly from an upper end of the base portion 268 and being generally rectangular in shape as illustrated in FIG. 9A.

The frame spring seat 240 includes at least one, preferably a plurality of slots 272 disposed circumferentially thereabout. Preferably, the slots 272 are radially located one hundred twenty degrees (120°) apart on the same pitch circle diameter corresponding to the mounting tabs 266 in the mounting cap 226. The slots 272 are generally rectangular in shape. The slots 272 have a narrowed portion 274 extending circumferentially from one end and having a width less than the slots 272 to receive the base portion 268 of the mounting tabs 266.

In operation of the fastener-less air spring assembly 210, the mounting cap 226 of the air spring 221 is attached to the frame spring seat 240 by locating the mounting tabs 266 relative to the slots 272 and extending the flange portion 266 therethrough. The mounting cap 226 is rotated such that the base portion 268 of the mounting tabs 266 moves into the narrower portion 274 of the slots 272 and locates it in place. The base 224 of the air spring 221 is attached to the axle spring seat 218 by disposing the first mounting clip 254 through the slot 252 such that the flange portion 258 overlaps the axle spring seat 218 and deflecting the second mounting clip 260 such that the flange portion 264 overlaps the axle spring seat 218. The air spring diaphragm 221 is then inflated. To remove the air spring 221, the air spring diaphragm 222 is deflated and the operation reversed to remove to the air spring 221 from the spring seats 218 and 240. It should be appreciated that the air inlet 235 of the mounting cap 226 extends through an aperture 276 in the top wall 242 of the frame spring seat 240. It should also be appreciated that the air spring diaphragm 222 may be inflated prior to attaching the base 224 to the axle spring seat 218.

The present invention has been described in an illustrative manner. It is to be understood that the terminology, which has been used, is intended to be in the nature of words of description rather than of limitation.

Many modifications and variations of the present invention are possible in light of the above teachings. Therefore, within the scope of the appended claims, the present invention may be practiced other than as specifically described.

What is claimed is:

1. A fastener-less spring assembly for a vehicle comprising:
    an axle spring seat adapted to be secured to an axle of a vehicle;
    a frame spring seat adapted to be secured to a frame of the vehicle;
    a spring having a base for engaging said axle spring seat and a mounting cap for attachment to said frame spring seat wherein said base includes a plurality of clips for attaching said base to said axle spring seat; and
    said frame spring seat having at least one slot extending therethrough and said mounting cap having at least one projection extending through said at least one slot and being rotated relative to said frame spring seat to prevent said at least one projection from exiting said at least one slot to attach said mounting cap to said frame spring seat.

2. A fastener-less spring assembly as set forth in claim 1 wherein said at least one projection comprises a mounting pin having a shaft portion extending axially and a head portion extending radially from said shaft portion.

3. A fastener-less spring assembly as set forth in claim 1 wherein said at least one projection comprises a center key having a base portion extending axially and opposed key portions extending radially from said base portion.

4. A fastener-less spring assembly as set forth in claim 1 wherein said at least one slot has a central aperture and opposed key slot portions extending radially from said aperture.

5. A fastener-less spring assembly as set forth in claim 1 including at least one anti-rotation tab extending upwardly from said mounting cap.

6. A fastener-less spring assembly as set forth in claim 1 wherein said clips comprise a base portion extending axially and a flange portion extending radially from said base portion.

7. A fastener-less spring assembly as set forth in claim 1 wherein said axle spring seat includes at least one slot to receive at least one of said clips.

8. A fastener-less spring assembly for a vehicle comprising:
    an axle spring seat adapted to be secured to an axle of a vehicle;
    a frame spring seat adapted to be secured to a frame of the vehicle;
    an inflatable air spring having a base for attachment to said axle spring seat and a mounting cap for attachment to said frame spring seat wherein said base includes a plurality of clips for attaching said base to said axle spring seat; and said frame spring seat having at least one slot extending therethrough and said mounting cap having at least one projection comprising a first portion extending axially and a second portion extending radially from said first portion and extending through said slot, said mounting cap being rotated relative to said frame spring seat to prevent said at least one projection from exiting said at least one slot to attach said mounting cap to said frame spring seat.

9. A fastener-less spring assembly as set forth in claim 8 wherein said second portion comprises opposed key portions extending radially from said first portion.

10. A fastener-less spring assembly as set forth in claim 9 wherein said at least one slot has a central aperture to receive said first portion and opposed key slot portions extending radially from said central aperture to receive said key portions.

11. A fastener-less spring assembly as set forth in claim 8 including at least one anti-rotation tab extending upwardly from said mounting cap.

12. A fastener-less spring assembly as set forth in claim 8 wherein said clips comprise a base portion extending axially and a flange portion extending radially from said base portion.

13. A fastener-less spring assembly as set forth in claim 8 wherein said axle spring seat includes at least one slot to receive at least one of said clips.

* * * * *